United States Patent

Biermacher et al.

Patent Number: 5,248,179
Date of Patent: Sep. 28, 1993

[54] WINDOW REVEAL MOLDING

[75] Inventors: Richard F. Biermacher, West Bloomfield; Patrick M. Harney, Sterling Heights, both of Mich.

[73] Assignee: Chrysler Corporation, Highland Park, Mich.

[21] Appl. No.: 911,641

[22] Filed: Jul. 10, 1992

[51] Int. Cl.$^5$ ............................................. B60J 10/02
[52] U.S. Cl. ................... 296/146.15; 296/93; 52/208; 52/400
[58] Field of Search .............. 296/93, 146 M, 201; 52/208, 397, 400, 403

[56] References Cited

U.S. PATENT DOCUMENTS

| | | | |
|---|---|---|---|
| 2,606,635 | 8/1952 | Clingman | 189/78 |
| 2,763,345 | 9/1956 | Clingman | 189/78 |
| 3,815,303 | 6/1974 | Ziegler | 52/99 |
| 4,347,693 | 9/1982 | Kruschwitz | 52/208 |
| 4,358,917 | 11/1982 | Oda et al. | 296/93 X |
| 4,401,340 | 8/1983 | Ankrupp et al. | 296/93 |
| 4,483,113 | 11/1984 | Kruschwitz | 52/208 |
| 4,826,232 | 5/1989 | Wissler | 49/498 X |
| 4,884,380 | 12/1989 | Yada et al. | 52/208 |
| 4,974,901 | 12/1990 | Katayama | 296/201 |
| 5,001,876 | 3/1991 | Harper et al. | 52/208 |

FOREIGN PATENT DOCUMENTS 0415005 3/1991 European Pat. Off. ............ 296/201
2556438 6/1985 France ............................... 296/201

Primary Examiner—Dennis H. Pedder
Attorney, Agent, or Firm—Edward P. Barthel

[57] ABSTRACT

A one-piece resilient flush-look reveal molding adapted for pre-attachment to a glass plate for concealing the gap between an automotive body panel window opening and the edge of the glass plate. The molding has a generally asymmetric I-beam shape providing a web portion with a first pair of substantially equal length long legs defining an inner open channel for receiving the glass plate edge. A second pair of short length legs define an opposite outer channel. The upper long and short legs combine to provide a major trim strip. The lower short leg has an extension leg portion which diverges upwardly and outwardly and terminates in a T-shaped minor trim strip normally disposed in a horizontal plane. Upon installation of the glass plate, the extension leg flexes about a living hinge so as to close-off the outer channel while the minor trim strip outer edge engaging the reveal flange causing the minor trim strip to cant thereby partially underlying the upper short leg or the major trim strip in a self-adjusting shingled manner. The result is that the major and minor trim strips function as a composite dual reveal trim strip providing a "flush" effect gap free appearance with the body panel.

8 Claims, 1 Drawing Sheet

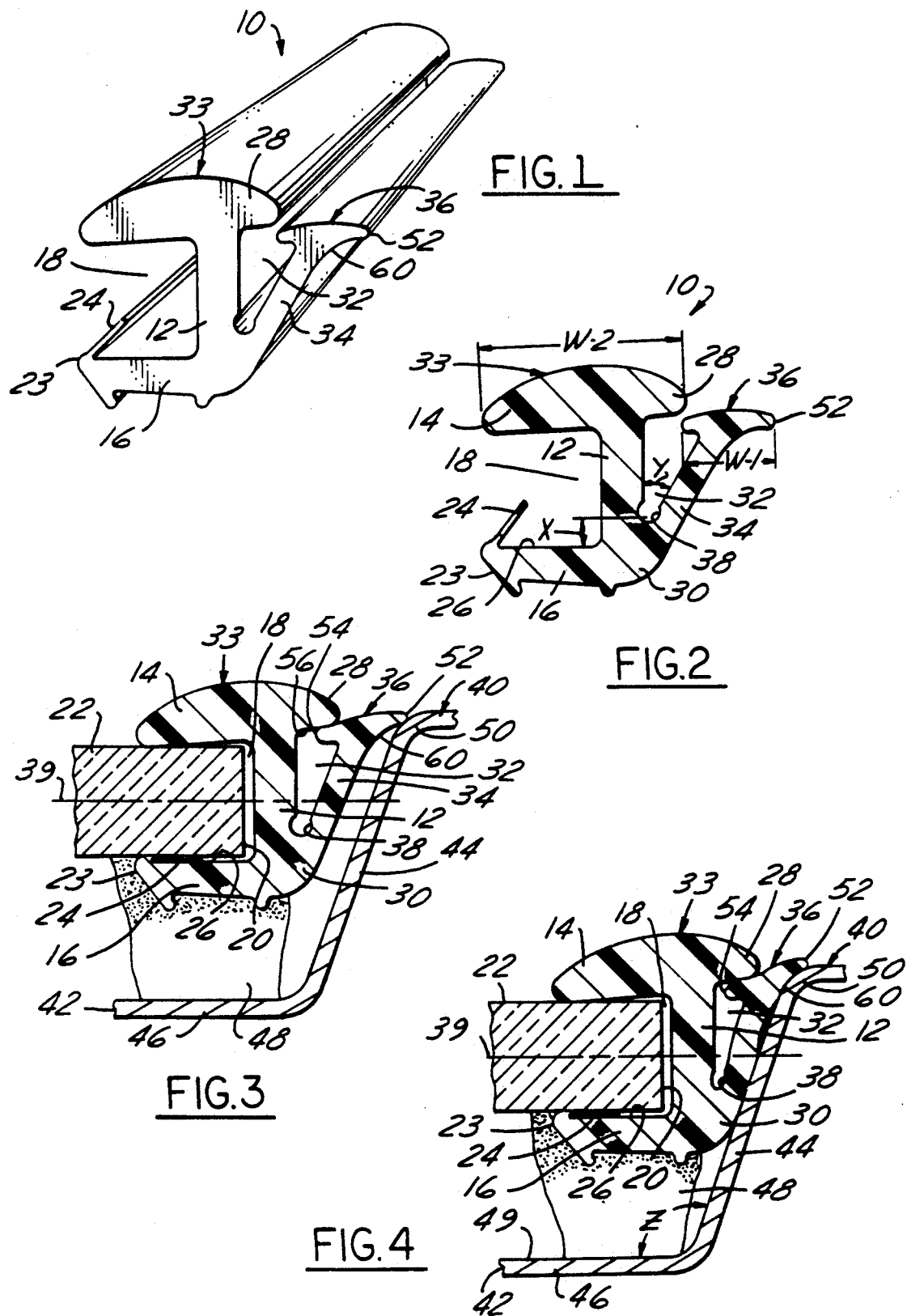

WINDOW REVEAL MOLDING

BACKGROUND OF THE INVENTION

This invention relates to a window molding for automotive vehicle bodies and more particularly to a pre-affixed glass plate molding which is adjustable for concealing various production tolerance differentials between the plate and the vehicle body window opening.

An example of a prior art molding in vehicle flanged window opening is shown in U.S. Pat. No. 4,358,917 issued Nov. 16, 1982 to Oda et al. entitled Self-Adjustable Window Molding For Retaining Glass. The Oda patent discloses an extruded flush-look window molding adapted for pre-attachment to a glass plate for concealing the gap between a body panel window opening and the edge of the glass plate. The Oda molding has a stem portion with first and first and second self-biased retaining legs on one side thereof, adapted to engage the glass plate edge and a diverging third leg extending from the stem portion opposite side supporting an integral acute sectioned trim strip in cantilever fashion on the diverging leg upper end. The trim strip projects inwardly to overlie the gap and the molding stem portion. The divergent leg is self-biased for cammed inward flexing during insertion of the glass plate. Thus, the trim strip self-adjuncts inwardly so as to maintain its engagement with the glass plate outer surface while accommodating production tolerance gaps.

The U.S. Pat. No. 5,001,876 issued Mar. 26, 1991 to Harper et al. entitled Flush Glass Windshield Reveal Molding which extends around the space between the glass panel and body panel and is able to accommodate spaces having varying widths. The Harper molding has a U-shaped clamping portion and an umbrella-shaped crown portion. The clamping portion is positioned on a bevel edge of a glass window to provide a flush appearance with the glass window.

The prior art includes window moldings that are generally adjustable in some manner. Examples of this art are U.S. Pat. Nos. 2,606,635, to P. E. Clingman; 2,763,345, to P. E. Clingman et al.; 3,815,303, to H. Ziegler; 4,347,693, to W. KruschWitz; 4,401,340, to J. H. Ankrapp et al.; 4,483,113 to W. Kruschwitz; 4,884,380 to Yada et al.; 4,974,901 to K. Katayama; and 5,001,876 to M. A. Harper et al. However, none of these patents disclose or teach applicants one-piece pre-affixed window reveal molding providing a composite major and minor trim strip arrangement wherein the minor trim strip automatically underlaps a variable overlying portion of the major trim strip in a shingled manner upon installation of the glass plate in the window opening to accommodate production tolerance gaps.

SUMMARY OF THE INVENTION

It is an object of the present invention to provide a one piece resilient glass plate reveal molding for a vehicle window having a relatively narrow overall width comprising a generally asymmetric I-beam shape in cross section adapted to bridge the variable dimension space between the glass plate edge and the flanged window opening.

It is a further object of the present invention to provide a glass plate reveal molding for a vehicle window wherein the molding includes composite major and minor trim strips adapted, upon installation, to act in a self-adjusting overlapping or "shingled" manner providing a "flush-like" effect gap free appearance with the vehicle body panel.

In accordance with the present invention, the glass molding has a web portion with a first pair of substantially equal length long legs defining an inner open channel for receiving the glass plate edge in a pre-affixed clamp-on manner. A second pair of equal length short legs define an opposite outer channel. The upper long and short legs, together with the intermediate web portion, combine to provide a major trim strip. The lower short leg is formed with an extension leg portion which diverges upwardly and outwardly terminating in a T-shaped minor trim strip normally disposed in its free state in a generally horizontal plane.

Upon installation of the glass plate and pre-attached molding in a vehicle window opening the extension leg is flexed by contact with the radiused edge of the window opening causing the extension leg to close-off the outer channel. The minor trim strip is urged into underlying shingle-like contact with the undersurface of the major trim strip upper short leg portion in a self-adjusting shingled manner. Thus, the molding major trim strip fully visible crown surface, together with the minor trim strip partially visible crown surface, provide a composite trim strip reveal molding presenting a uniform flush-like gap free appearance throughout a production tolerance gap range.

BRIEF DESCRIPTION OF THE DRAWINGS

These and other objects, features and advantages of the invention will appear from the following written description and the accompanying drawings in which:

FIG. 1 is a perspective view of an elongated molding made in accordance with the present invention;

FIG. 2 is cross section of the molding of FIG. 1;

FIG. 3 is a fragmentary cross-section of a part of an automobile body windshield opening, illustrating a construction incorporating the invention; and FIG. 4 is a view similar to FIG. 3, but illustrating the application of the invention to a window opening with a reduced spacing.

DETAILED DESCRIPTION OF THE INVENTION

Referring now to the drawings, FIG. 1 is a perspective view of a clamp-on glass plate elongated molding generally indicated at 10. The molding 10 is formed as an integral extruded member preferably of a flexible elastomeric material, such as rubber or polyvinyl chloride. With reference to FIG. 2, the molding has a generally asymmetric I-beam shape in cross section defining an upright web portion 12 having a first pair of substantially equal length upper 14 and lower 16 inboard long legs. The inboard long legs 14 and 16 provide an inner open channel 18 for receiving an edge 20 of glass plate 22, shown in FIGS. 3 and 4, in a clamping manner. It will be noted in FIG. 2 that free end 23 of the lower inboard long leg 16 has a thin gripper fin portion 24. The fin portion 24, shown angled upwardly and inwardly at an acute angle, is adapted to overlie interior surface 26 of the long leg by virtue of extending into the inner channel 18 from the lower leg free end insuring tight positive retention of the glass plate 22.

The web portion 12 has a second pair of equal length upper 28 and lower 30 outboard short legs defining an outer channel 32 positioned in opposed relation to the inboard channel 18. In the preferred embodiment the inner long legs 14 and 16 are each of the order of two to three times greater in length than the upper 28 and lower 30 short legs. It will be further noted that the upper inner long leg 14 and its opposite upper outboard short leg 28, together with an intermediate portion of the web, combine to provide a single major crown trim strip, generally indicated at 33.

With reference to FIG. 2, the outer lower short leg 30 has a predetermined thickness, substantially twice the thickness of the lower long leg 16 in the present embodiment, with the difference shown by the dimension "X". Said differently, the juncture of the extension leg 34 with the web portion 12 is located a predetermined offset dimension above the lower long leg interior surface 26 with the off set dimension being about one-half the thickness of the lower long leg. The bottom short leg 30 has formed thereon an extension leg 34 which extension leg terminates at its upper free end in a minor crown trim strip 36. It will be seen that the minor crown trim strip 34, which is disposed in a generally horizontal plane in its free state, has a predetermined overall width. In the disclosed form, the minor trim strip overall width "W-1" is of the order of one-half the overall width "W-2" of the major crown trim strip 33. FIG. 2 shows that in its normal free state the extension leg portion 34 diverges upwardly and outwardly from the vertical or the web portion 12 at a predetermined acute angle "Y". In the disclosed embodiment, the angle "Y" is of the order of thirty degrees.

It will be noted that at the internal juncture of the web portion 12 and the extension leg 34 a radiused semi-circle 38, open at the top, is formed providing the extension leg with a living hinge for a reason to be explained below. Thus, the extension leg 34 is hingedly or pivotally integrally connected to the short leg 30 at the semi-circle living hinge 38.

FIG. 3 shows the long legs 14 and 16 positioned on opposite sides of the glass plate 22 providing a substantially equal amount of mass above and below the central plane of the glass plate defined by dashed line 39. As a result, a substantially even clamping pressure is applied by the long legs 14 and 16 to their respective glass plate sides. The fin portion 24 is positioned to yieldingly engage and underlie the inner side of the glass plate 22 in a sealing manner.

FIG. 3 further illustrates a portion of a vehicle outer body panel 40 which forms a window opening 42. The window opening 42 is defined by an "open-angle" or standard draw rebate having an angled or sloped reveal shoulder wall flange 44 and an inwardly directed depressed seat or fence flange 46 extending at an obtuse angle to the reveal flange 44. In the disclosed embodiment, the wall flange 44 is shown in FIG. 4 sloped outwardly from the horizontal fence flange 46 at an obtuse angle "Z" of the order of one hundred and ten degrees (110 degrees).

The fence flange 46 supports the window glass plate 22 in opening 42 and is fixed in location with respect to the wall flange 44 by the molding 10. An adhesive, such as indicated at 48, can be introduced continuously around the fence flange 46 as a bead. Upon the glass plate being inserted in the window opening, the adhesive bead is compressed and seals between the glass plate inner surface, the lower long leg 16, an the opposed surface 49 of the fence flange 46. The adhesive is allowed to cure and harden as the vehicle moves along an assembly line.

With reference to FIG. 3, it will be seen that upon the installation of the glass plate 22 in the window opening 42 the radiused edge 50 engages the outboard edge 52 of the minor trim strip 36. This engagement results in the extension leg 34 being pivoted toward the web 12 from its normal free state of FIG. 2 to its position of FIG. 3 causing the minor trim strip inboard edge 54 to partially engage underside surface 56 of the upper short leg 28 in an under-lapping or shingle-like manner.

FIG. 4 depicts the gap between the glass plate edge 20 and the wall flange 44 measured along the central plane of the glass plate 39 is of the order of three-quarters of the maximum gap situation shown in FIG. 3. It will be noted in FIG. 4 that upon the placement of the glass plate 22 and attached molding 10 in the window opening the radiused portion 50 will engage the minor trim strip adjacent its radiused juncture 60 with the extension arm 34 rather than at its outboard tip 52, as in FIG. 3. This results in the extension leg being pivoted inward toward the web 12 and consequently the minor trim strip 36 having its inner edge 52 moved closer to the web as seen in FIG. 4. Thus, the self-adjusting shingled arrangement between the major trim strip 33 and the minor trim strip 36 enables the dual trim strips to provide a "flush-like" effect gap free appearance throughout a predetermined production tolerance gap range.

It is a feature of the present invention that the relatively narrow width molding 10 is uniquely adapted for use with an open or obtuse angled wall flange shown by obtuse angle "Z" in FIG. 4. In contrast, it will be noted in the above mentioned patent 4,358,917 that the Oda et al. molding has an overall width of the order of the instant molding 10 for use with an upright or vertical reveal flange. However, it would be necessary to perform a costly second "cam-forming" operation to convert applicants sloped or open-angled wall flange 44 flange to the vertical reveal flange such as shown, for example, by the Oda et al. patent. Thus, the reveal molding 10 of the instant invention uniquely provides a relatively narrow width molding which is adapted to conceal the enlarged gap width of an open-angled or sloped wall flange window opening.

While the principles of the present invention in connection with the specific test device has been described, it is to be understood the foregoing detailed description has been made by way of example only and not as a limitation to the scope of the invention as set for in the accompanying claims.

What is claimed is:

1. A flexible one-piece molding pre-attached to an edge of a glass plate for closing a vehicle body window receiving opening in a body panel defined by a rebate forming a reveal flange and a fence flange intersecting at an included obtuse angle, said reveal flange and said body panel providing a radiused juncture defining said window opening, the glass plate and molding upon location in the opening being retained by a bead of curable adhesive, the plate when located in the opening having a variable gap between the reveal flange and the edge of the glass plate, said molding comprising:

an elongated strip having an I-beam shape in ross section providing an upstanding web having a first inner pair of substantially equal length upper and lower long legs and a second outer pair of substantially equal length upper and lower short legs, said long legs defining an inner open channel for receiving said glass plate edge and said short legs defining an opposed outer channel;

said upper inner long leg and said upper outer short leg together with an intermediate portion of said web providing a single major train strip portion disposed substantially parallel with the plane of said glass plate and defining a continuous major visible surface;

said outer lower short leg having formed thereon a flexible extension leg which extends upwardly and outwardly from said web at a predetermined acute angle in its free state, said extension leg terminating at its upper free end in a minor trim strip disposed substantially parallel with the plane of said glass plate in said extension leg fee state and defining a continuous minor external surface substantially co-planar with an undersurface of said upper short leg;

whereby upon the installation of said glass plate in the window opening said minor trim strip having an undersurface portion thereof contacting said radiused juncture causing said extension leg to be pivotally flexed toward said stem such that a variable portion of said minor trim strip underlies said upper outer short leg in a self-adjusting shingled manner enabling said major trim strip exterior surface and said minor trim strip exterior surface to establish a composite shingled visible surface providing a gap free appearance with the body panel radiused juncture.

2. The flexible one-piece vehicle window reveal molding as set forth in claim 1 wherein both said major trim strip and said minor trim strip having a crown upper visible surface.

3. The flexible one-piece vehicle window reveal molding as set forth in claim 2 wherein said minot trim strip having an of overall width which is one-half the overall width of the major trim strip.

4. The flexible one-piece vehicle window real molding as set forth in claim 1 wherein aid extension leg joins said lower sort leg at an internal living hinge juncture in the form of a radiused simi-circle open the to whereby said extension leg is pivoted substantially about the center of said semi-circle toward said web upon said minor trim strip undersurface contacting said window opening readjusted juncture.

5. The flexible one-piece vehicle window reveal molding as set forth in claim 1 wherein the juncture of said extension leg with said web portion is located a predetermined offset dimension above said lower long leg interior surface thereof, wherein said offset dimension is about one-half the thickness of said lower long leg.

6. The flexible one-piece vehicle window reveal molding as set forth in claim 1 wherein said extension leg in its free state defining a predetermined acute angle with said web portion of the order of thirty degrees.

7. The flexible one-piece vehicle window reveal molding as set forth in claim 1 wherein said lower long leg having an interior surface formed with an inwardly angled thin gripper fin portion adapted to overlie said interior surface insuring tight positive retention of the glass plate.

8. The flexible one-piece vehicle window reveal molding as set forth in claim 1 wherein said included obtuse angle is 110 degrees.

* * * * *